Patented Apr. 7, 1942

2,279,282

UNITED STATES PATENT OFFICE 2,279,282

ALLOY

Rene Wassermann, Woodmere, N. Y.

No Drawing. Application November 13, 1940,
Serial No. 365,483

1 Claim. (Cl. 75—178)

This invention relates to alloys or similar compound material, preferably made in the form of rods.

It is an object of the present invention to provide an inexpensive but highly effective alloy for brazing, welding or soldering purposes, the new alloy being particularly applicable to steel material, sheet metal, profiles, tubes, etc., made of cast iron, copper, brass and bronze.

It is another object of the present invention to provide an alloy which contains selected proportionate constituents which alloy has unusual strength and hardness, but which is highly fluidous during the brazing or like operation and has a perfect affinity to ferreous materials and steel.

A further object of the present invention is to provide an alloy particularly suitable for oxyacetylenic welding, the properties of said alloy being not affected by high temperatures of the welding torch.

Yet, another object of the present invention is to povide an alloy of the above nature which has high mechanical and physical properties and at the same time possesses the characteristic of deep penetration within the base material.

These and other objects of the invention are realized from the following description which discloses one example incorporating the invention.

The ingredients or substances employed are: nickel, copper, zinc, silicon or phosphorus and silver. These substances may be preferably mixed in following proportions:

| | Per cent by weight |
|---|---|
| Nickel | 9 to 16 |
| Copper | 42 to 48 |
| Silicon or phosphorus | .2 to 1 |
| Silver | 1 to 48 |

Zinc forming the remainder of the mixture.

An alloy comprised of the above ingredients in substantially the mentioned proportions possesses a hardness of about 180 to 235 Brinell and has a strength of about 70 to 80 kg./mm$^2$. An alloy made in accordance with this invention should contain copper, nickel and zinc constituents and may further contain silver, but must contain silicon or phosphorus to provide an alloy having the characteristics herein-above mentioned. The composition may be molded in the form of a rod which is employable for brazing purposes preferably on steel and other ferreous metals and will be found to possess besides high tension strength, higher mechanical and physical properties than heretofore known. Brinell hardness of the alloy made in accordance with the invention is increased to about 180 to 235, which usually attains in heretofore used alloys about 80 to 110. The exact balanced composition possesses a high affinity to the atomic structure of ferreous metals. Micrographic examination shows particularly deep penetration of the alloy by capillary action within the base metal treated.

A comparison of an alloy made in accordance with this invention with other brazing alloys discloses the relatively high fluidity on ferreous metals and steel, which fluidity can be compared to a brazing alloy only containing a high percentage of silver.

Having thus described the invention what is claimed as new and desired to be secured by Letters Patent is:

An alloy consisting of the following ingredients in substantially the following proportions: nickel 9% to 16% by weight, copper 42% to 48% by weight, phosphorus .2% to 1% by weight, and zinc forming the balance of the mixture.

RENE WASSERMANN.